Feb. 10, 1970     E. J. KRAUS     3,494,600

PARTICLE EXPANDER

Filed July 3, 1967

INVENTOR.
EDMUND J. KRAUS
BY
ATTORNEYS

United States Patent Office 3,494,600
Patented Feb. 10, 1970

3,494,600
PARTICLE EXPANDER
Edmund J. Kraus, 800 N. Main St.,
Orange, Calif. 92667
Filed July 3, 1967, Ser. No. 650,914
Int. Cl. F27b 1/10, 1/20, 3/00
U.S. Cl. 263—21     8 Claims

ABSTRACT OF THE DISCLOSURE

An expander for particulate material including a chamber adapted to receive a quantity of liquid, which is rotated so as to adhere to a heated cylindrical wall. Unexpanded particulates are introduced through a frustoconical rotating conduit and discharged to enter the liquid and become expanded by the heat of the liquid. When expanded to less than the density of the liquid, the particles leave the liquid and are discharged from the chamber, being dried by a flow of air as they are exhausted.

BACKGROUND OF THE INVENTION

The field of the invention

This invention relates to expanders for particulate material.

The prior art

At the present time, expanded foam plastics are widely used in the manufacture of containers, cartons and various other items. This may be, for example, disposable drinking cups made from a considerable number of expanded foam plastic pellets fused together to form a unitary structure. This type of item is desirable not only because of its low cost, which allows it to be expendable in nature, but also because of its light weight and low thermal conductivity. In addition, such containers are odorless, tasteless, nonabsorbent and nontoxic.

Commonly, cups or other products are made from plastic pellets or beads charged with a foaming agent. Generally, the pellets are small polystyrene beads, and the activating gas is methylchloride, butane, heptane, or the like.

Prior to introducing the pellets into a mold where they are to be fused into the completed article, the pellets are given a pre-expansion by elevating their temperature for a brief period. This may be accomplished, for example, through a drum into which steam is injected to heat and expand the pellets. A serious difficulty has been in the lack of any control over the density of the resulting prefoamed pellets. It is critical to the production of a satisfactory article that the pellets are given a proper and uniform density. If the pellets are expanded too much, the items produced from the pellets will have little strength, and frequently will include flaws rendering them unacceptable. Furthermore, if the pellets are expanded excessively they will not pass through the narrow passageways of the mold. Too little expansion also is undesirable. This is, of course, wasteful and costly by utilizing too much plastic for each unit produced. The greater density means that the resulting item sacrifices insulative qualities. Therefore, for products of uniform high quality, the density of the prefoamed pellets must be held within close limits. As a result of an inability to control the pre-expansion of the pellets used in expanded foam plastic products, therefore, production has been seriously hampered. Reject rates have been extremely high and the quality of the products so manufactured has suffered.

A more controlled expansion of the plastic beads is accomplished in the design of my Patent 3,262,686 in which the beads are advanced by an auger screw into a heated vessel, where their temperature is raised to effect the expansion. In order to prevent agglomeration of the beads, it is necessary to utilize a rotating blade arrangement to maintain the beads in an agitated condition. The blades that keep the beads stirred up and prevent them from sticking together also have the undesirable effect of forcing the beads downwardly in the container and partially collapsing them. Thus, while heat is being imparted to the beads to cause pre-expansion, the blades within the unit cause some compression of the beads, again reducing the bead size. In this way, the device works against itself, and the blowing agent is expended without resulting in the degree of expansion of the beads that would take place normally from the amount of heat given to them. When ultimately used, therefore, such beads may not have sufficient blowing agent within them to expand adequately for fusing together into the completed article.

SUMMARY OF THE INVENTION

The present invention overcomes these difficulties, providing an arrangement by which the foam plastic beads are given a precisely controlled expansion, yet in which there is nothing to prematurely collapse the beads and reduce their volume. The device includes a vessel which retains a quantity of water, which is rotated by a vane arrangement at the bottom of the vessel. The rotation of the water causes it by centrifugal force to adhere to the circumferential upstanding wall of the vessel rather than lying at the bottom. The water is heated by a source of heat along the circumferential wall. Plastic beads are introduced into the vessel through a conical member that distributes them along the bottom of the vessel adjacent the rotating surface of the water. The conical member also is in rotation, so that the plastic beads are subjected to centrifugal force as they enter the device. The beads, before expansion, have approximately the density of the water or slightly greater, so that they are forced to enter the water and rotate about the circumferential wall with it. After a brief period within the water, however, the beads become expanded from the heat, and their density decreases. As a result, they are forced to the surface of the water and leave the water to rise out the center portion of the device around the rotating inlet. A rotating vane at the outlet drives the beads through a suitable conduit to a storage receptacle. As the beads leave the heated vessel, there is a current of air which effectively dries them, so that there is no difficulty from the adherence of moisture to the beads.

An object of this invention is to provide an improved arrangement for expanding foam plastic beads or the like.

Another object of this invention is to provide an expander giving a controlled expansion to the beads without subsequently collapsing them.

A further object of this invention is to provide a particle expander that is of simple, low cost construction having few moving parts.

Yet another object of this invention is to provide an expander for plastic beads providing for a continuous flow of the beads through the unit.

An additional object of this invention is to provide an expander which will result in a superior pre-expanded bead of a predetermined density, having the capability for full subsequent expansion.

These and other objects will become apparent from the following detailed description taken in connection with the accompanying drawing.

DESCRIPTION OF THE PREFERRED EMBODIMENT

Figure 1:
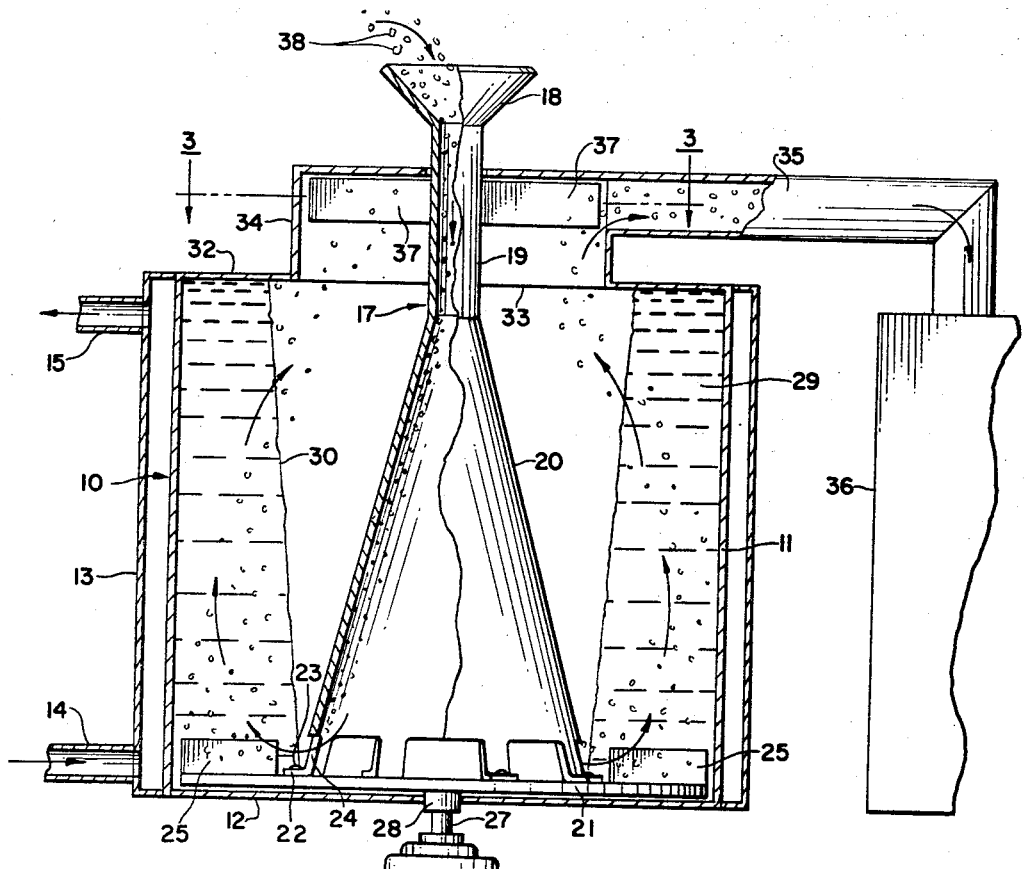
FIGURE 1 is a longitudinal sectional view of the expander of this invention.
Figure 2:
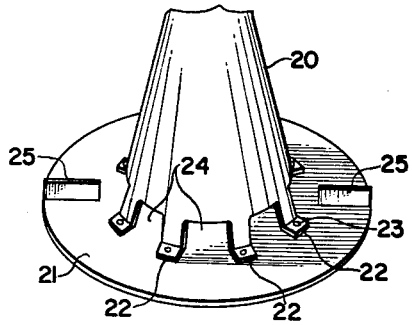
FIGURE 2 is a fragmentary perspective view of the bottom portion of the inlet conduit and the attached rotatable disc, with these components being removed from the remainder of the device.
Figure 3:
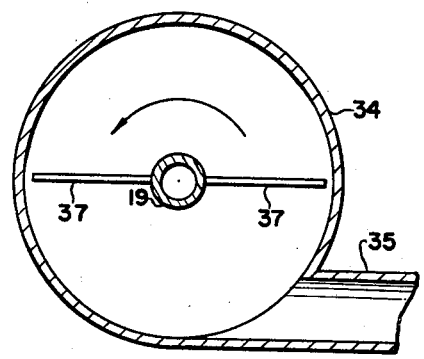
FIGURE 3 is a sectional view taken along line 3—3 of FIGURE 2.

As illustrated in the drawing, the device of this invention includes a chamber 10 having a cylindrical vertical sidewall 11 and a horizontal bottom wall 12. A jacket 13 circumscribes the wall 11 and is used to heat the wall 11. Thus, it includes inlet and outlet fittings 14 and 15 for conducting steam or other heated fluid through the jacket. Other heating arrangements may be used, such as a resistance heater circumscribing the wall 11.

Extending along the axis of the vessel 10 is a pellet inlet feed conduit 17. This may include a tapered inlet funnel 18 at the top outside the vessel 10, leading to a vertical passageway 19 which, in turn, communicates with a frustoconical section 20 within the chamber. The bottom of the portion 20 is attached to a disc 21. This may be accomplished by short flanges 22 held by fasteners 23 to the disc 21. Openings 24 are provided intermediate the flanges 22.

Outwardly of the base of the frustoconical section 20 is a pair of opposed vanes 25. The disc 21, and hence the vanes 25 and the bead inlet conduit 17, are rotated by a motor 26 which drives a shaft 27 extending through a bearing and seal 28 at the bottom wall 12.

Within the chamber 10 is a quantity of water or other liquid 29 which is rotated by the vanes 25 when the motor 26 is in operation. As the water 29 is rotated, centrifugal force causes it to adhere to the wall 11 of the chamber. Consequently, the surface 30 of the water approaches vertical alignment, and the water is forced away from the base of the frustoconical section 20 of the inlet 17.

At the upper end of the chamber, a wall 32 retains the water at that location and leads to an outlet opening 33 that extends into a scroll 34. An outlet conduit 35 extends from the scroll 34 and leads to a suitable storage receptacle 36 for receiving the pre-expanded pellets. Within the scroll 34 are opposed vanes 37 which are attached to the section 19 of the inlet unit 17 and rotated by it.

In use of the device of this invention, the vanes 25 are rotated by the motor at a suitable speed, such as around 1750 r.p.m., to cause the water to assume the contour illustrated in FIGURE 1 as centrifugal force drives it against the cylindrical wall 11. The water will be heated by the fluid flowing through the jacket 13, so that it is raised to a suitable temperature for imparting sufficient heat to beads to cause a desired amount of expansion thereof. The unexpanded beads 38 are then introduced through the inlet member 17, where they begin to rotate at approximately the same rotational speed as the water. The beads drop downwardly from the entrance 18 and the straight section 19 into the frustoconical section 20. At the bottom of the frustoconical section adjacent the disc 21, the unexpanded beads are driven outwardly by centrifugal force, leaving the frustoconical section 20 through the exit openings 24. The shape of the section 20, flaring outwardly toward the bottom, causes centrifugal force to help move the beads downwardly toward the disc 21 and the outlets 24.

In the condition of the beads as they enter the chamber 10, the beads have a density approximating that of the water or slightly greater than the water's density. As a result, when they are driven outwardly by centrifugal force, the beads are caused to enter the water, going beneath the surface 30 of the water. While within the water, the beads receive heat from the water, which causes them to begin to expand. As a result, the beads lose density and are less influenced by the rotation. Therefore, the lighter expanded beads work toward the surface 30 of the water and move upwardly in the vessel 10. Ultimately, upon becoming expanded sufficiently to have a density less than that of the water, the beads emerge from the surface 30 of the water and enter the open portion of the chamber between the inlet conduit 17 and the water 29. The light expanded pellets rise upwardly through the outlet 33 into the scroll 34, where the rotating vanes 37 direct them through the conduit 35. From there, they are conducted into the storage receptacle 36. Air flows along with the pellets, entering the chamber 10 through the passageways 18, 19 and 20, leaving the latter through the openings 24. This air flows through the central portion of the chamber into the scroll 34 and the outlet 35.

As the beads leave the chamber 10, they enter the atmosphere and continue in their rotational pattern as they are moved through the scroll and into the outlet passageway 35. As a result, the beads are dried off as they leave the expander so that, even though they have been expanded within the water 29, they are not wet when they enter the storage receptacle 36.

The beads expanded in this manner achieve precisely the desired amount of pre-expansion, resulting in a superior product ideally suited for end use in formation of a completed article. The water or other liquid 29 can be held to exactly the right temperature to effect the required pre-expansion. The device operates on a continuous flow, so that there is a steady output for immediate use at the outlet of the machine. It is of very simple construction, economically made and virtually maintenance free. There is nothing within the device to contact the beads and cause them to become collapsed or crushed, as all of the blowing agent within each bead is used in the intended way in accomplishing bead expansion.

The foregoing detailed description is to be clearly understood as given by way of illustration and example only, the spirit and scope of this invention being limited solely by the appended claims.

What is claimed is:

1. A device for expanding heat-expansible particles comprising
    a chamber,
    means for rotating a quantity of heated liquid in said chamber so that said liquid adheres to the wall of said chamber and provides a zone at the axis of said chamber free of liquid,
    means for introducing into said liquid unexpanded heat-expansible particles of a density at least as great as said liquid for causing said particles to expand from the heat of said liquid and become reduced in density so as to subsequently be forced out of said liquid into said zone,
    and means for receiving said particles so expanded.

2. A device for expanding heat-expansible particles comprising
    a chamber having a curved wall,
    a quantity of liquid in said chamber occupying less than the total volume of said chamber,
    means for rotating said liquid for causing said liquid through centrifugal force to adhere to said curved wall and provide a zone at the axis of said chamber that is free of said liquid,
    means heating said liquid so rotated,
    and means for introducing unexpanded heat-expansible particles into said chamber for being caused by centrifugal force to enter into said liquid to receive heat therefrom and become expanded and upon such expansion becoming less dense and leaving said liquid to enter said zone.

3. A device for expanding heat-expansible particles comprising
   a chamber having a substantially cylindrical wall,
   a quantity of liquid in said chamber occupying less than the total volume of said chamber,
   means for rotating said liquid so as to cause said liquid to adhere to said cylindrical wall and to provide a zone at the axis of said chamber that is free of said liquid,
   means for heating said liquid so rotated,
   means for introducing heat-expansible particles into said chamber in a rotational pattern adjacent one end of said chamber for causing said particles through centrifugal force to enter said liquid,
      whereby said particles become heated by said liquid and become expanded,
         thereby becoming less dense and subsequently being forced out of said liquid into said zone,
   and means for exhausting said particles so expanded from said chamber.

4. A device for expanding foam plastic beads comprising
   a chamber having a substantially cylindrical wall,
   a quantity of liquid in said chamber occupying less than the total volume of said chamber,
   paddle means in said chamber and rotatable therein for causing said liquid to rotate and adhere to said cylindrical wall while providing a zone at the axis of said chamber free of said liquid,
   means for heating said cylindrical wall for imparting heat therefrom to said liquid to maintain said liquid so rotating at an elevated temperature,
   a rotatable conduit means at the axis of said chamber for introducing expansible plastic beads into said chamber,
      said conduit means having an outlet means adjacent one end of said chamber and adjacent said liquid so rotating for discharging said beads into said chamber adjacent said liquid,
         whereby said beads through centrifugal force are caused to enter said liquid and receive heat therefrom,
            thereby expanding said beads to reduce the density thereof to cause said beads to leave said liquid and enter said zone,
   an outlet for said beads so expanded,
   and means for causing said expanded beads to move through said outlet to a location remote from said chamber.

5. A device as recited in claim 4 in which
   said conduit means includes a tapered portion,
      said tapered portion flaring outwardly toward said one end of said chamber,
      said outlet means of said conduit means being around the periphery of said tapered portion for thereby discharging said beads adjacent said liquid so rotating.

6. A device for expanding foam plastic beads comprising
   a chamber having a substantially cylindrical wall,
   means for heating said cylindrical wall,
   a quantity of water in said chamber occupying less than the total volume of said chamber,
   a disc adjacent one end of said chamber,
   means for rotating said disc,
   paddle means on said disc for rotating said water upon rotation of said disc for causing said water by centrifugal force to adhere to said cylindrical wall while providing a zone at the axis of said chamber free of said water,
   an inlet conduit for introducing unexpanded foam plastic beads into said chamber,
   said inlet conduit including a frustoconical portion the base of which is attached to said disc for rotation therewith,
      said frustoconical portion having outlet means adjacent said disc for discharging said unexpanded foam plastic beads into said chamber at said one end of said chamber adjacent said water so rotating, so that said beads by centrifugal force enter said water and receive heat therefrom for expanding said beads and reducing the density thereof for subsequently forcing said beads out of said water towards the interior of said chamber and into said zone,
   an outlet means for said chamber adjacent the opposite end thereof,
   and rotating vane means in said outlet means of said chamber for causing said plastic beads upon being expanded to be driven from said chamber to a location remote therefrom.

7. The method of expanding foam plastic beads comprising the steps of
   rotating a quantity of liquid in a vessel having a substantially cylindrical wall so as to cause said liquid to adhere to said cylindrical wall,
   heating said liquid so rotated,
   introducing into said liquid a quantity of expansible foam plastic beads of a density at least equal to that of said liquid for causing said foam plastic beads through centrifugal force to enter said liquid,
   and then allowing said beads to expand in said liquid from heat received from said liquid, and to be driven from the surface of said liquid upon reduction in density of said beads from said expansion.

8. The method of expanding heat-expansible foam plastic beads comprising the steps of
   rotating a quantity of water in a chamber having a cylindrical wall for causing said water to adhere to said wall,
   heating said wall for thereby transmitting heat to said water so rotated,
   then rotating expansible foam plastic beads of a density at least equal to that of said water and introducing said rotating beads into said water,
      for causing said beads to receive heat from said water and become expanded and to subsequently emerge from said water,
   and then removing said beads so expanded from said chamber.

References Cited

UNITED STATES PATENTS

| | | | |
|---|---|---|---|
| 2,944,292 | 7/1960 | Norrhede | 264—51 |
| 3,139,272 | 6/1964 | Couchman | 264—53 X |
| 3,165,303 | 1/1965 | Paulson. | |
| 3,262,686 | 7/1966 | Kraus et al. | |
| 3,378,245 | 4/1968 | Frank. | |

WILLIAM J. STEPHENSON, Primary Examiner

U.S. Cl. X.R.

18—1; 252—378; 264—53